(12) United States Patent
Saito et al.

(10) Patent No.: US 9,541,707 B2
(45) Date of Patent: Jan. 10, 2017

(54) METHOD FOR CONNECTING MULTI-CORE FIBER, MULTI-CORE FIBER, AND METHOD FOR MANUFACTURING MULTI-CORE FIBER

(71) Applicant: FURUKAWA ELECTRIC CO., LTD., Chiyoda-ku, Tokyo (JP)

(72) Inventors: Tsunetoshi Saito, Tokyo (JP); Katsunori Imamura, Tokyo (JP); Kengo Watanabe, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/474,177

(22) Filed: Aug. 31, 2014

(65) Prior Publication Data

US 2015/0055923 A1 Feb. 26, 2015

Related U.S. Application Data

(63) Continuation of application No. PCT/JP2012/080456, filed on Nov. 26, 2012.

(30) Foreign Application Priority Data

Mar. 1, 2012 (JP) ................................. 2012-045298

(51) Int. Cl.
*G02B 6/26* (2006.01)
*G02B 6/255* (2006.01)
(Continued)

(52) U.S. Cl.
CPC ....... *G02B 6/2555* (2013.01); *C03B 37/01222* (2013.01); *G02B 6/02042* (2013.01);
(Continued)

(58) Field of Classification Search
CPC .................... G02B 6/02042; G02B 6/02338
See application file for complete search history.

(56) References Cited

U.S. PATENT DOCUMENTS

| | | | | |
|---|---|---|---|---|
| 2010/0296784 | A1* | 11/2010 | Imamura ............ | G02B 6/02042 385/126 |
| 2011/0206331 | A1* | 8/2011 | Imamura ........... | C03B 37/01222 385/127 |

FOREIGN PATENT DOCUMENTS

| | | |
|---|---|---|
| JP | 58-13505 U | 1/1983 |
| JP | 61-105513 A | 5/1986 |

(Continued)

OTHER PUBLICATIONS

International Search Report for PCT/JP2012/080456 mailed Feb. 19, 2013.

(Continued)

*Primary Examiner* — Thomas A Hollweg
*Assistant Examiner* — Mary A El Shammaa
(74) *Attorney, Agent, or Firm* — Hauptman Ham, LLP

(57) ABSTRACT

A multicore fiber 1 includes a plurality of cores 3 disposed at predetermined intervals and surrounded by a cladding 5. The multicore fiber 1 also includes a marker 7 formed apart from the cores 3. The refractive index of the marker 7 is different from those of the cores 3 and the cladding 5. For example, the marker 7 may be made of a material having lower refractive index than that of the cladding 5. In this case, for example, the cores 3 may be made of germanium-doped quartz. The cladding 5 may be made of pure quartz. The marker 7 may be made of fluorine-doped quartz. Further, the marker 7 may be an empty hole.

14 Claims, 12 Drawing Sheets

(51) Int. Cl.
    *C03B 37/012*     (2006.01)
    *G02B 6/02*     (2006.01)

(52) U.S. Cl.
    CPC ........ *G02B 6/2551* (2013.01); *C03B 2203/14* (2013.01); *C03B 2203/34* (2013.01); *G02B 6/02338* (2013.01)

(56) References Cited

FOREIGN PATENT DOCUMENTS

| | | |
|---|---|---|
| JP | 63-33102 U | 3/1988 |
| JP | 6355505 A | 3/1988 |
| JP | 1-246510 A | 10/1989 |
| JP | 8-114720 A | 5/1996 |
| JP | 2002-148468 A | 5/2002 |
| JP | 2005-173210 A | 6/2005 |
| JP | 2010-518449 A | 5/2010 |
| JP | 2011-158768 A | 8/2011 |
| WO | 2008/098119 A1 | 8/2008 |
| WO | 2010/073821 A1 | 7/2010 |

OTHER PUBLICATIONS

Kengo Watanabe et al., "Study of Fusion Splice for Multicore Fiber", The Institute of Electrical Engineers of Japan Tsushin Kenkyukai Shiryo, Nov. 17, 2011, CMN-11, 43. 45-64, pp. 31 to 34.
Office Action mailed Dec. 1, 2015, corresponding to Japanese Patent Application No. 2012-045298.
Office Action in JP Application No. 2012-045298, mailed Jul. 26, 2016.

\* cited by examiner

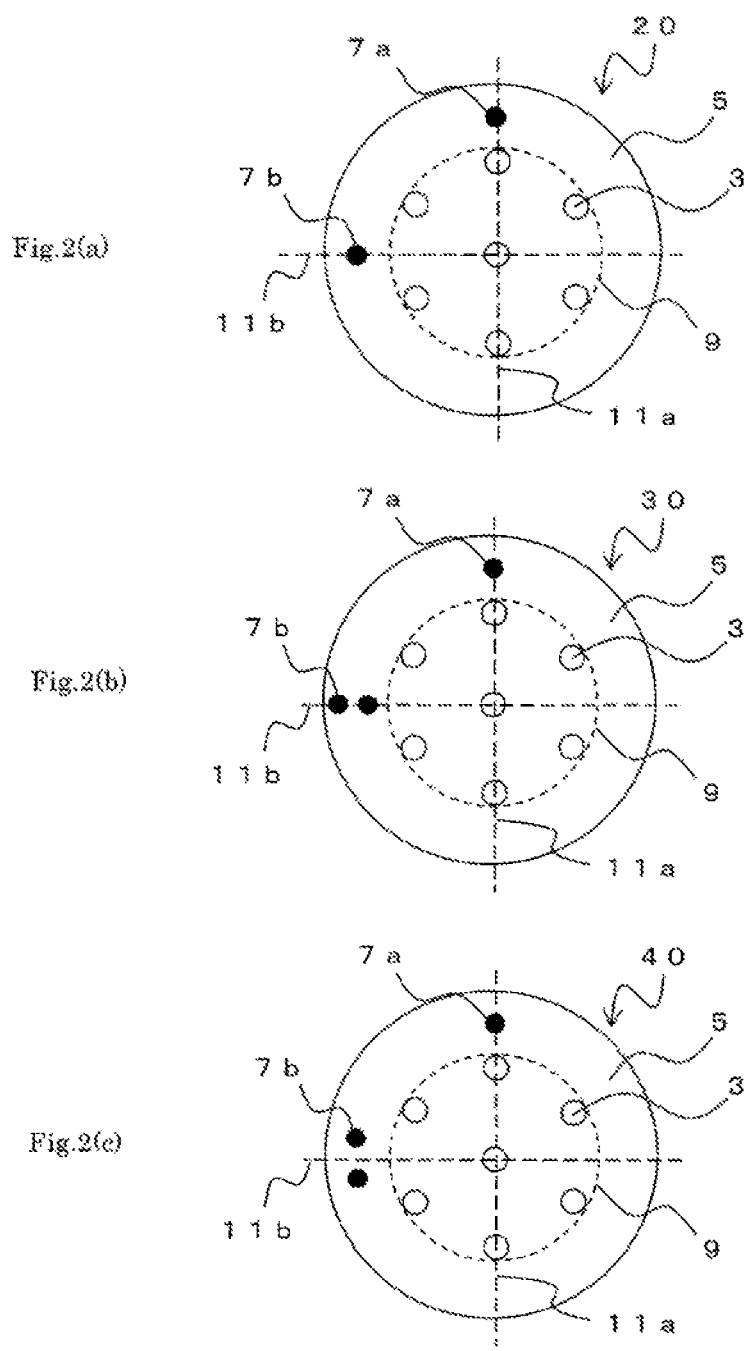

METHOD FOR CONNECTING MULTI-CORE FIBER, MULTI-CORE FIBER, AND METHOD FOR MANUFACTURING MULTI-CORE FIBER

RELATED APPLICATIONS

The present application is a continuation of International Application Number PCT/JP2012/080456, filed Nov. 26, 2012, which claims priority from Japanese Application Number 2012-045298, filed Mar. 1, 2012, the disclosures of which application are hereby incorporated by reference herein in their entirety.

TECHNICAL FIELD

The present invention relates to a method of splicing multicore fibers including a plurality of cores and the like.

BACKGROUND ART

The transmission capacity of single-core optical fibers that are currently used is approaching its limit due to the rapidly increasing volume of optical communication traffic. In response to this situation, a multicore fiber in which multiple cores are formed in one fiber has been proposed as a means for increasing the communication capacity.

Such multicore fibers are spliced together by, for example, disposing end surfaces of the multicore fibers to face each other, applying light from one side of the multicore fibers to detect an output of the light received at the other side of the multicore fibers, and relatively moving the multicore fibers in horizontal and vertical directions to align axes at positions at which the output of the light becomes maximum (Patent Document 1).

PRIOR ART DOCUMENT

Patent Document

[Patent Document 1] JP S63-55505A

SUMMARY OF THE INVENTION

Technical Problem

The foregoing method can be applied to the cases of splicing multicore fibers together in advance at a factory. However, when the method is applied to the cases of splicing, for example, multicore fibers laid besides the tracks in a field, the operation is difficult. Thus, a need still exists for a method of splicing multicore fibers together that enables easy splicing of the multicore fibers even in a field.

The present invention is in view of the above problem and is aimed at providing a method of splicing connecting multicore fibers or the like that enables easy fusion splicing of multicore fibers even in a field.

Technical Solution

To attain the above described object, a first invention is a method for fusion splicing a multicore fiber in which at least one of objects to be spliced together is a multicore fiber including a plurality of core portions, a cladding portion surrounding the plurality of core portions, and a marker portion disposed apart from the plurality of core portions, the method comprising: disposing the multicore fiber to face an object to be spliced that includes a marker corresponding to the marker portion; determining a position of each of the core portions of the multicore fiber by use of the marker portion, and conducting rotation core alignment of the position with a position of a desired core portion of the object to be spliced; and fusing the multicore fiber with the object to be spliced.

At least one marker portion may be disposed at a position shifted from an arbitrary line-symmetric axis with respect to a disposition of the plurality of core portions on a cross-sectional surface of the multicore fiber.

As to the marker portion, two types of the marker portions may be provided, and the marker portions may be positioned substantially perpendicularly to each other on a cross-sectional surface of the multicore fiber.

Desirably, the multicore fiber and the object to be spliced are fused together by discharges of three electrodes disposed in three directions on a cross-sectional surface of the multicore fiber.

Desirably, the three electrodes are disposed at equal distances in a circumferential direction on three line-symmetric axes with respect to a disposition of the plurality of core portions on the cross-sectional surface of the multicore fiber.

Desirably, the multicore fiber includes seven core portions in total, which are disposed at a center and around the center at equal distances in a hexagonal shape. Desirably, at least one marker portion is disposed at a position shifted from an arbitrary line-symmetric axis with respect to the disposition of the plurality of core portion, and an angle of a positional shift from a nearest line-symmetric axis is 8° to 22°.

Two types of the marker portions may be provided, and the marker portions may be positioned substantially perpendicularly to each other on a cross-sectional surface of the multicore fiber. Each of the marker portions may be formed on any of the line-symmetric axes with respect to a disposition of the plurality of core portions.

Desirably, the marker portion has a refractive index that is different from a refractive index of the core portion and a refractive index of the cladding portion. In this case, the marker portion may be made of a material having a refractive index that is lower than a refractive index of the cladding portion, or the marker portion may be an empty hole.

Desirably, at least one marker portion is provided outside the core portions that are outermost core portions on a cross-sectional surface of the multicore fiber. The marker portion may be exposed on a surface of the multicore fiber.

After the multicore fibers are disposed to face each other, light may be applied to side surfaces of the multicore fibers so that profiles of the light having passed through the multicore fibers are obtained to determine positions of the marker portions of the multicore fibers, and core portions of the multicore fibers may be aligned.

The light may be applied to the multicore fibers from two directions that are substantially perpendicular to each other so that profiles of the light having passed through the multicore fibers are determined, and central positions of the multicore fibers may be aligned.

After the multicore fiber and the object to be spliced are disposed to face each other, end surfaces of the multicore fiber and the object may be checked to determine a position of the marker portion of the multicore fiber, and positions of the core portions of the multicore fiber may be aligned.

According to the first aspect of the invention, the marker portion is provided on the cross-sectional surface of the multicore fiber so that each core portion of the multicore fiber can be aligned with the core portion of the object with ease through alignment of the position of the marker portion.

Further, the marker portion is disposed at the position shifted from the arbitrary line-symmetric axis with respect to the disposition of the plurality of core portions on the cross-sectional surface of the multicore fiber so that both end surfaces of the multicore fiber can be discriminated from each other. In other words, it is possible to reliably determine which one of the end surfaces of the multicore fiber the end surface being observed is. Thus, each core portion can reliably be discriminated based on its position with respect to the marker portion.

Further, two types of marker portions are positioned substantially perpendicularly to each other on the cross-sectional surface of the multicore fiber so that the position of each core portion with respect to the marker portion can reliably be determined. Further, when the position of the marker portion is observed from two different directions, the position of the marker portion can be aligned more reliably.

Further, two types of marker portions are disposed substantially perpendicularly on the cross-sectional surface of the multicore fiber, and the two types of marker portions are disposed on arbitrary line-symmetric axes with respect to the disposition of the plurality of core portions so that the position of each core portion with respect to the marker portion can reliably be determined.

According to the present invention, the two types of marker portions refer to marker portions that are different in refractive index, size, shape, number, etc. The two types of marker portions that are different in number are, for example, marker portions one of which is a single marker and the other one of which is a plurality of markers disposed adjacently to each other.

Further, the marker portion has a different refractive index from those of the core portion and the cladding portion so that the marker portion can be discriminated more reliably. In this case, the marker portion is made of a material having a lower refractive index than that of the cladding portion so that the transfer of light to the marker portion can be reduced and the discriminability of the marker portion can be improved. Further, the marker portion is formed as an empty hole so that the discriminability of the marker portion can further be improved.

Further, at least one marker portion is provided outside the outermost core portions on the cross-sectional surface of the multicore fiber so that the marker portion can be discriminated more reliably. For example, when light is applied to the side of the multicore fiber to determine the position of the marker portion from the profile of the light, the closer the marker portion is to the outer surface on the cross-sectional surface, the clearer the marker portion can be discriminated. Thus, the marker portion is disposed at the position closer to the outer surface so that the discriminability of the marker portion can be improved.

Furthermore, the marker portion is exposed on the surface of the multicore fiber to further improve the discriminability of the marker portion.

Further, after the multicore fibers are disposed to face each other, the light is applied to the side surfaces of the multicore fibers so that profiles of the light having passed through the side surfaces are obtained to determine relative positions of the multicore fiber and the marker portion, and then the positions of the core portions of the multicore fibers are aligned, whereby the alignment of the core portions can be conducted with ease even in the fields.

In this case, the light is applied to the multicore fibers from two directions that are substantially perpendicular to each other, and profiles of the light having passed through the multicore fibers are obtained so that both the core alignment of the central positions of the multicore fibers and the rotation core alignment of the core portions can be conducted.

Further, after the multicore fiber and the object to be spliced are disposed to face each other, the end surfaces of the multicore fiber and the object are checked so that the marker portion of the multicore fiber can be determined. In this case, the core alignment of the core portions of the multicore fibers can also be conducted.

A second aspect of the invention is a multicore fiber including a plurality of core portions, a cladding portion surrounding the plurality of core portions, and a marker portion disposed apart from the plurality of core portions, and the marker portion is exposed on a surface of the multicore fiber.

The second aspect of the invention makes it possible to obtain a multicore fiber with excellent discriminability of the marker portion and less amount of light transferring to the marker portion.

A third aspect of the invention is a multicore fiber including a plurality of core portions, a cladding portion surrounding the plurality of core portions, and a marker portion disposed apart from the plurality of core portions, and either the marker portion is made of a material having a refractive index that is lower than a refractive index of the cladding portion, or the marker portion has a diameter that is smaller than a diameter of the core portions, whereby a transfer of light from any core portions to the marker portion is −20 dB or less.

The third aspect of the invention makes it possible to obtain a multicore fiber with reduced light loss.

A fourth aspect of the invention is a method of producing a multicore fiber, the method including: forming a plurality of holes in a fiber preform and respectively inserting a core preform and a marker preform into the holes, wherein the core preform forms a core portion and the marker preform forms a marker portion; and cutting an outer periphery of the fiber preform such that a part of the marker preform is exposed and thereafter drawing the fiber preform while heating the fiber preform so that the marker portion is exposed on a surface of the multicore fiber.

The fourth aspect of the invention makes it possible to produce with ease the multicore fiber including the marker portion exposed on the outer surface.

Advantageous Effect of the Invention

The present invention can provide a method of splicing connecting multicore fibers or the like that enables easy fusion splicing of multicore fibers even in a field.

BRIEF DESCRIPTION OF THE DRAWINGS

FIG. 2(a) is a cross sectional view illustrating a multicore fiber 20.

FIG. 2(b) is a cross sectional view illustrating a multicore fiber 30.

FIG. 2(c) is a cross sectional view illustrating a multicore fiber 40.

FIG. 7 (d) is conceptual diagrams illustrating an obtained light profile.

FIG. 9(a) illustrates a discharge state of the multicore fiber 40a.

FIG. 9(b) illustrates a discharge state of the multicore fiber 40a.

FIG. 12 illustrates the step of drawing a multicore fiber preform 35a.

DETAILED DESCRIPTION OF PREFERRED EMBODIMENTS

Figure 1A:
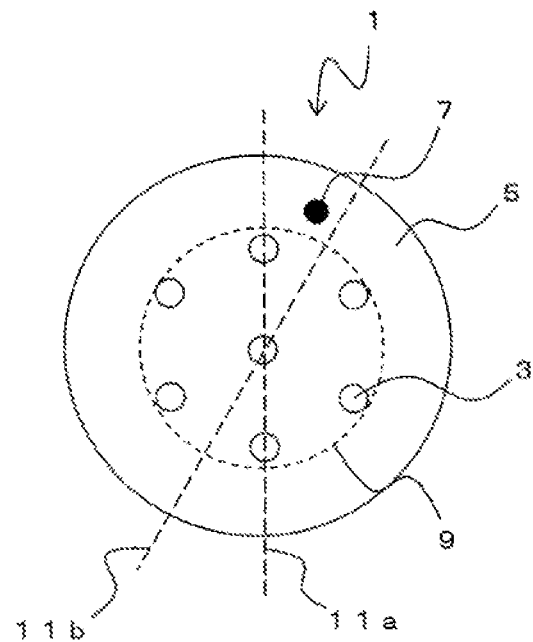
FIG. 1(a) is a cross sectional view illustrating a multicore fiber 1.

The following describes a multicore fiber 1 according to an embodiment of the present invention. FIG. 1(a) is a cross sectional view illustrating the multicore fiber 1. The multicore fiber 1 includes a plurality of cores 3 and a cladding 5. The plurality of cores 3 are disposed at predetermined intervals and surrounded by the cladding 5. The multicore fiber 1 includes seven cores 3 in total. One of the seven cores 3 is disposed at a center of the multicore fiber 1, and the other six cores 3 are respectively disposed at vertices of a regular hexagon around the center. In other words, the six cores 3 around the core 3 at the center are equidistant from the core 3 at the center. Further, distances between adjacent cores 3 of the six cores 3 are also the same. The pitch of the cores 3 is, for example, about 40 to 50 μm.

While the following describes the multicore fiber having seven cores 3 as an example, the present invention is not limited to the multicore fiber described below, and the number, disposition, etc. of the cores may be set as appropriate.

The multicore fiber 1 includes a marker 7 provided apart from the cores 3. The marker 7 has a refractive index that is different from those of the cores 3 and the cladding 5. For example, the marker 7 may be made of a material having a refractive index that is lower than a refractive index of the cladding 5. In this case, for example, the cores 3, the cladding 5, and the marker 7 may be made of germanium-doped quartz, pure quartz, and fluorine-doped quartz, respectively. Further, the marker 7 may be an empty hole.

The refractive index of the marker 7 is set lower than the refractive index of the cladding 5 to increase a difference in refractive index between the marker 7 and the cladding 5 so that in a pattern of light detected when the light enters the multicore fiber laterally during the core alignment described below, the marker 7 portion has a low luminance. This makes it possible to discriminate the marker reliably and clearly. Further, in order to more reliably reduce a transfer of the light to the marker 7, the marker 7 desirably has a smaller diameter than the core diameter. In this way, a transfer of the light from the cores 3 to the marker 7 can be reduced to −20 dB or less.

When the refractive index of the marker 7 is lower than the refractive index of the cores 3, this indicates that the effective refractive index of the marker 7 is low. Accordingly, when the marker 7 includes a plurality of layers, this indicates that the effective refractive index obtained from the entire marker 7 is low.

On the cross-sectional surface of the multicore fiber 1, the marker 7 is disposed at a position shifted from an arbitrary line-symmetric axis (line-symmetric axes 11a and 11b in the example illustrated in the figures) of a disposition of the cores 3. If the marker 7 is positioned on the line-symmetric axis, the dispositions of the cores 3 and the marker 7 on both end surfaces of the multicore fiber 1 appear to be the same. This makes it impossible to identify which one of the end surfaces the observed end surface is. If a wrong end surface is observed, the disposition of each core with respect to the marker 7 becomes opposite to cause connection of wrong core portions.

As the foregoing describes, the marker 7 is disposed at a position shifted from an arbitrary line-symmetric axis of the cores 3 on the cross-sectional surface so that even when only one marker 7 is provided, it is possible to identify which one of the end surfaces of the multicore fiber 1 the observed end surface is. This ensures that desired cores are connected together.

Desirably, the marker 7 is positioned close an outer surface of the multicore fiber 1. The closer the marker 7 is to the outer surface of the multicore fiber 1, the more clearly the marker 7 can be recognized during the core alignment described below. Further, the farther the marker 7 is from the cores 3, the more the transfer of light from the cores 3 can be prevented.

Thus, the marker 7 is desirably positioned outside a core periphery 9 (a circle that is concentric to the center of the multicore fiber 1, includes all cores 3, and circumscribes outermost cores 3) of the cores 3. More desirably, the marker 7 is positioned at 50 μm or less from the outer surface of the multicore fiber 1.

Figure 1B:
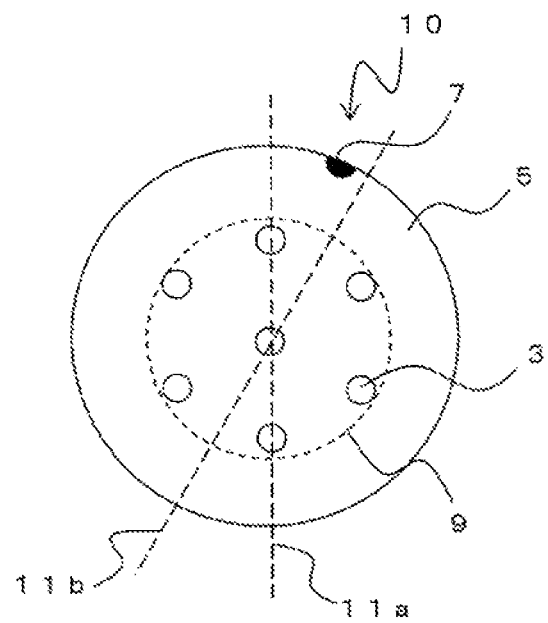
FIG. 1(b) is a cross sectional view illustrating a multicore fiber 10.

Further, the marker 7 may be exposed on the outer surface. FIG. 1(b) is a cross-sectional view illustrating a multicore fiber 10 including the marker 7 exposed on an outer surface of the multicore fiber 10. The multicore fiber 10 produces similar advantages to those produced by the multicore fiber 1. Furthermore, the multicore fiber 10 can more reliably prevent the transfer of light from the cores 3.

Further, instead of forming the marker 7 at one position, the marker 7 may be formed at a plurality of positions. One example is a multicore fiber 20 illustrated in FIG. 2(a). The multicore fiber 20 includes markers 7a and 7b.

In this case, the markers 7a and 7b are desirably provided at substantially perpendicular positions to each other. In this way, when the multicore fiber 20 is irradiated with light from a plurality of directions to observe the profile of the light on the surface of the multicore fiber 20 during the core alignment described below, the markers 7a and 7b can clearly and reliably be recognized regardless of the direction of the irradiation with the light.

While FIG. 2(a) illustrates the markers 7a and 7b disposed on the line-symmetric axes 11a and 11b, respectively, at least one of the markers 7a and 7b may be disposed at a position shifted from the line-symmetric axes 11a and 11b as in the multicore fiber 1, etc. Further, instead of making the markers 7a and 7b exactly the same, the shape or size of each of the markers 7a and 7b may be modified to form two types of markers. In this way, even when the markers 7a and 7b are positioned on the line-symmetric axes, it is possible to recognize which one of the end surface the observed end surface is.

Further, when two types of markers are provided, the number of the markers may be changed. One example is a multicore fiber 30 including two types of markers 7a and 7b as illustrated in FIG. 2(b). In this case, the marker 7b includes two markers. As the foregoing describes, the size, shape, number, etc. of the markers may be altered. Further, the two types of markers may have different refractive indices to enable discrimination between the markers.

While the two markers of the marker 7b of the multicore fiber 30 are provided next to each other in a radial direction from the center, the two markers of the marker 7b may be provided next to each other in a direction that is substantially perpendicular to the radial direction. For example, as in a multicore fiber 40 illustrated in FIG. 2(c), two markers may be provided next to each other in a substantially circumferential direction. When multiple markers are provided next to each other as described above, the profile of light during the core alignment described below varies depending on the direction in which the multiple markers are provided next to each other. Thus, the disposition of the markers may be set as appropriate according to the arrangement of the cross-sectional surface of the multicore fiber and a core alignment method.

Further, the foregoing arrangements may be used in combination. According to the present invention, as long as the marker 7 (7a, 7b) is provided on the cross-sectional surface, the disposition and form of the marker 7 (7a, 7b) can be set as appropriate.

Figure 3:
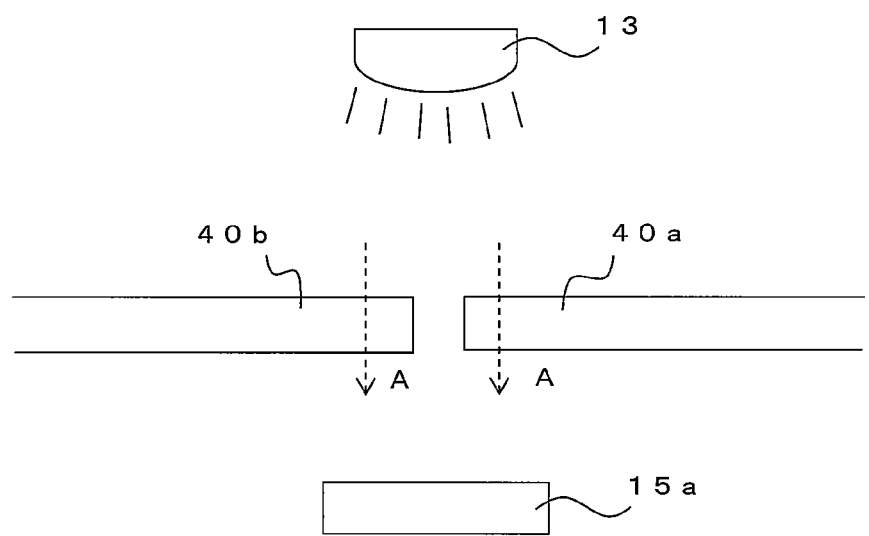
FIG. 3 illustrates a method for the core alignment of multicore fibers 40a and 40b.

The following describes a method for the core alignment and splicing of multicore fibers. FIG. 3 is a schematic diagram illustrating a method for the core alignment of multicore fibers 40a and 40b. While the method will be described with reference to the cross-sectional surface of the multicore fiber 40 illustrated in FIG. 2(c), the present invention is also applicable to a multicore fiber having any other cross-sectional surface arrangement. Furthermore, while the following describes a method for the core alignment and splicing of multicore fibers, objects to be spliced together according to the present invention are not limited to a multicore fiber as long as at least one of the objects to be spliced together is the multicore fiber described above. For example, one of the objects to be spliced may be a bundled single-core fiber or the like.

End surfaces of the multicore fibers 40a and 40b are polished and then disposed to face each other. In this state, side surfaces of the multicore fibers 40a and 40b (in the direction that is perpendicular to the axial direction) are irradiated with light emitted from a light source 13 (the direction of arrows A in FIG. 3).

On the side opposite to the light source 13 across the multicore fibers 40a and 40b is provided a monitor 15a. The monitor 15a detects the profile of light having passed through the multicore fibers 40a and 40b.

When only the rotation core alignment of the multicore fibers 40a and 40b is conducted, the light may be applied to the multicore fibers 40a and 40b only from one direction to detect the profile of the light having passed through the multicore fibers 40a and 40b. Alternatively, the light may be applied from two directions.

Figure 4:
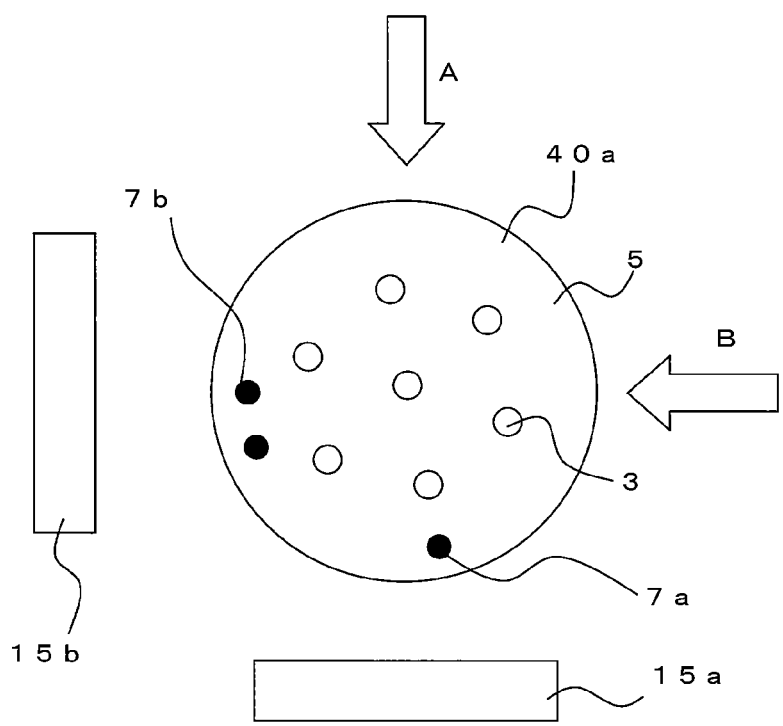
FIG. 4 illustrates the multicore fiber 40a being irradiated with light.

For example, as illustrated in FIG. 4, the light may be applied from two directions that are perpendicular to each other (the directions of arrows A and B in FIG. 4), and monitors 15a and 15b may be disposed across the multicore fibers 40a and 40b to observe the profiles of the light from the respective directions and adjust the positions of the outer shapes.

Figure 5:
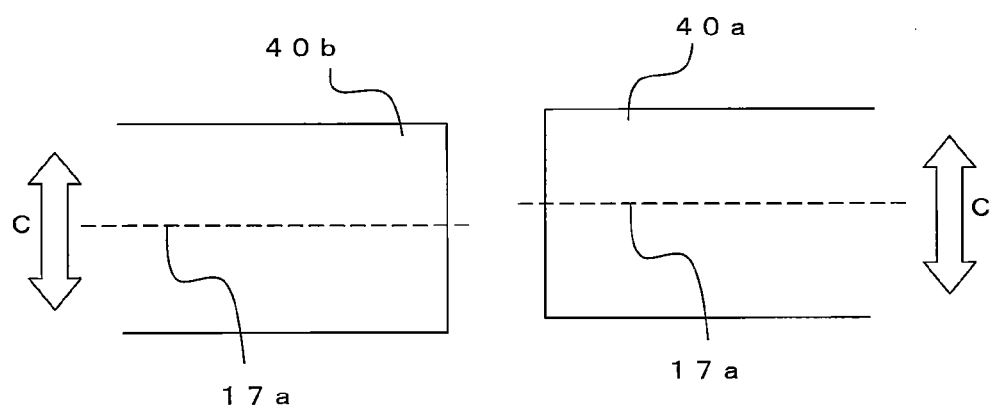
FIG. 5 illustrates a method for the core alignment of the multicore fibers 40a and 40b.

FIG. 5 illustrates a method for the core alignment of the multicore fibers 40a and 40b in XY-directions. For example, the positions of the multicore fibers 40a and 40b may be detected from the outer shapes of the multicore fibers 40a and 40b detected by the respective monitors, and then the relative position of each of the multicore fibers 40a and 40b in the X-direction (or Y-direction) may be adjusted (the direction of arrows C in FIG. 5). The foregoing may be performed in two directions that are perpendicular to each other so that the positions of central axes 17a and 17b of the multicore fibers 40a and 40b are core-aligned.

Figure 6:
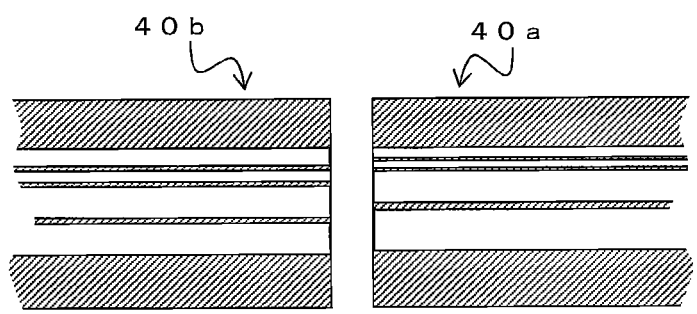
FIG. 6 is a conceptual diagram illustrating patterns of light on surfaces of the multicore fibers 40a and 40b.

The following describes a method for the rotation core alignment of the multicore fibers 40a and 40b. FIG. 6 is a conceptual diagram illustrating the profile of the light that has been applied to the sides of the multicore fibers 40a and 40b and passed through the multicore fibers 40a and 40b to reach the opposite sides of the multicore fibers 40a and 40b as described above.

The incident light from the sides of the multicore fibers 40a and 40b is reflected, scattered, and the like in the multicore fibers 40a and 40b to form a pattern of light on the surfaces on the opposite side. Since the cores, the cladding, and the marker that have different refractive indices from each other are formed on the cross-sectional surfaces, the patterns corresponding to the dispositions of the cores, the classing, and the marker are formed.

FIG. 7 is a conceptual diagram illustrating the profiles of the light based on the dispositions of the cores 3, the cladding 5, and the markers 7a and 7b on the cross-sectional surfaces of the multicore fibers. As described above, when the light enters the sides of the multicore fibers, the monitor 15a disposed at the opposite side detects the patterns of the light.

Figure 7A:
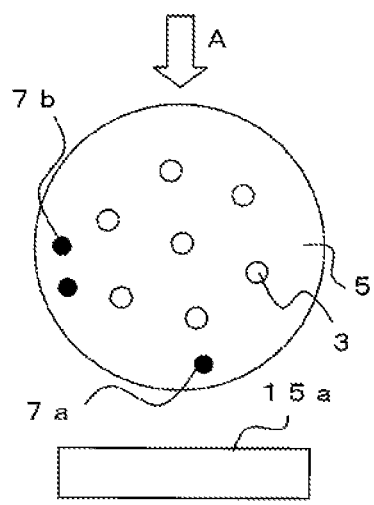
FIG. 7(a) illustrates the direction in which light is caused to enter.
Figure 7C:
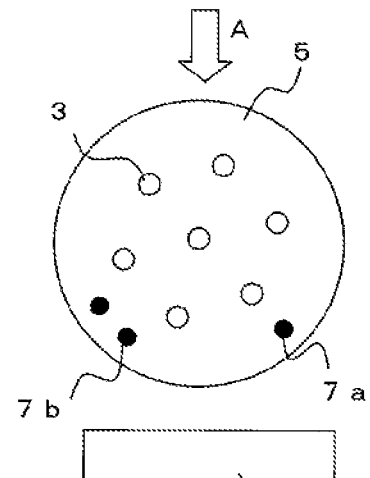
FIG. 7(c) illustrates the direction in which light is caused to enter.
Figure 7B:
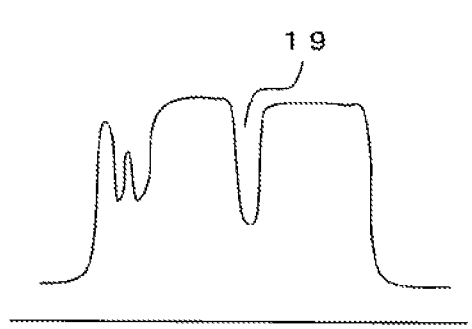
FIG. 7 (b) is conceptual diagrams each illustrating an obtained light profile.

For example, when the light enters the multicore fiber having the cross-sectional arrangement illustrated in FIG. 7(a) (the direction of an arrow A in FIG. 7(a)), the monitor 15a disposed at the opposite side can detect the profile of the light in the form of a luminance distribution of the light as illustrated in FIG. 7(b). In this case, for example, a low luminance portion 19 corresponding to the position of the marker that has the lowest refractive index is formed.

Figure 7D:
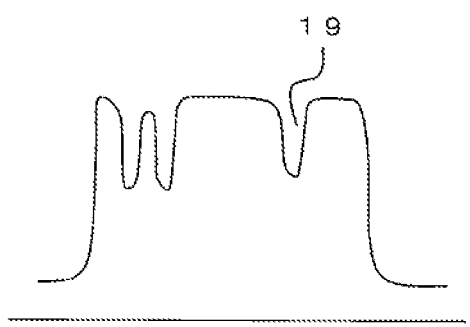

Similarly, when the light enters the multicore fiber having the cross-sectional arrangement illustrated in FIG. 7(c) (the direction of an arrow A in FIG. 7(c)), the monitor 15a disposed at the opposite side can detect the profile of the light in the form of a luminance distribution of the light as illustrated in FIG. 7(d). In this case, a low luminance portion 19 corresponding to the position of the marker that has the lowest refractive index is also formed.

When the markers are disposed on the monitor side as illustrated in FIG. 4 or 7, a clearer image (profile) can be obtained. The present invention, however, is not limited to this disposition, and the relation between the monitor and the markers can be set as appropriate. For example, when the markers are disposed at the side opposite to the monitor, the core alignment can still be conducted adequately using the markers.

It is to be noted that since the light is repeatedly reflected and the like in the optical fibers, the positions of the markers in the transverse direction (horizontal direction in the figure) with respect to the multicore fibers do not match the positions of the low luminance portion 19 formed in the transverse direction. Therefore, it is difficult to determine the exact positions of the markers from the obtained profile of the light. However, the profile of the light has a unique form corresponding to the positions of the markers and the like.

Thus, whether the angles are the same can be determined through observation of the profiles of the light of the multicore fibers 40a and 40b disposed to face each other. Specifically, as described above, first, the central axes (i.e., central core positions) of the multicore fibers 40a and 40b are core-aligned, and then one or both of the multicore fibers 40a and 40b is/are relatively rotated such that the profiles match, whereby the positions of the cores 3 can be rotation-aligned.

As the foregoing describes, the cores of the multicore fibers 40a and 40b are rotation-aligned, and then the multicore fibers 40a and 40b are fused together to complete the splicing of the multicore fibers 40a and 40b.

Figure 8A:
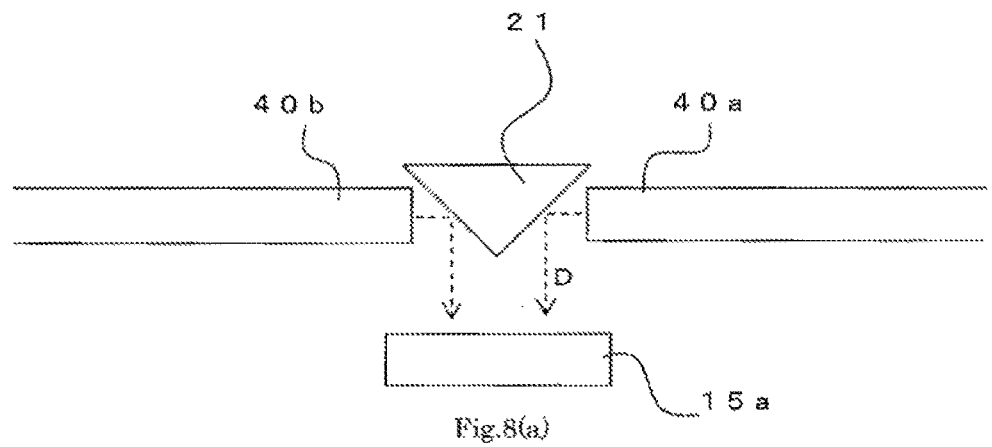
FIG. 8(a) illustrates a method for the core alignment of the multicore fibers 40a and 40b.

FIG. 8 illustrates another method for the core alignment. First, as illustrated in FIG. 8(a), end surfaces of the multicore fibers 40a and 40b are polished and then disposed to face each other. Between the multicore fibers 40a and 40b is disposed a mirror 21. The mirror 21 has a reflection surface of an angle of about 45 degrees on both sides to reflect each of the end surfaces of the multicore fibers 40a and 40b toward the monitor 15a (the direction of an arrows D in FIG. 8(a)).

Figure 8B:
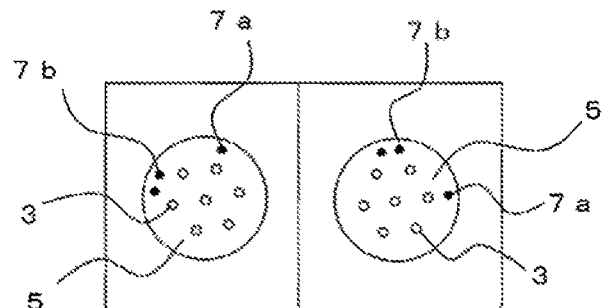
FIG. 8(b) illustrates a method for the core alignment of the multicore fibers 40a and 40b.

FIG. 8(b) is a conceptual diagram illustrating the end surfaces of the multicore fibers 40a and 40b displayed on the monitor 15a. The light is caused to enter the end surfaces of the multicore fibers 40a and 40b on the opposite sides so that, since the cores 3, the cladding 5, and the markers 7 have different refractive indices, the monitor 15a displays the dispositions of the cores 3, the claddings 5, and the markers 7a and 7b. Then, one or both of the multicore fibers 40a and 40b is/are relatively rotated such that the positions of the cores 3, the cladding 5, and the markers 7a and 7b of the multicore fiber 40a respectively match the positions of the cores 3, the cladding 5, and the markers 7a and 7b of the multicore fiber 40b, whereby the positions of the cores 3 can be rotation-aligned.

Figure 8C:
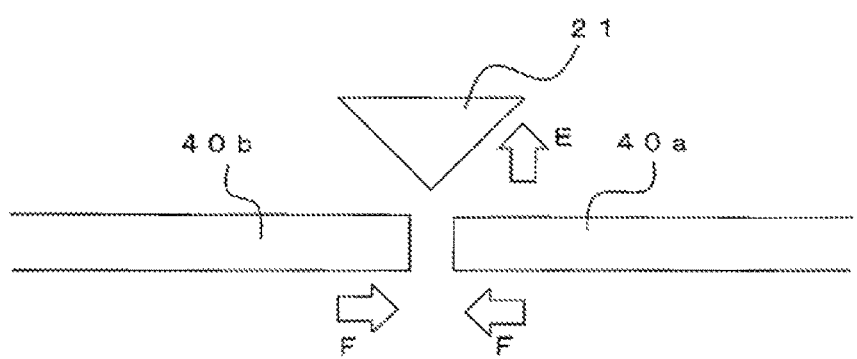
FIG. 8(c) illustrates a method for the core alignment of the multicore fibers 40a and 40b.

After the rotation core alignment of the multicore fibers 40a and 40b is completed, the mirror 21 is removed from the position where the multicore fibers 40a and 40b face each other (the direction of an arrow E in FIG. 8(c)), and then the multicore fibers 40a and 40b are moved in opposite directions (the directions of arrows F in FIG. 8(c)) and fused together, whereby the splicing of the multicore fibers 40a and 40b is completed.

The present invention is also applicable to any method other than the rotation core alignment methods described above. The present invention is applicable to any core alignment/splicing method using a marker on a cross-sectional surface of a multicore fiber in which the angle of rotation of the multicore fiber is adjusted based on the position of the marker on the cross-sectional surface to align the cores of the multicore fiber with cores of an object to be spliced.

Figure 9A:
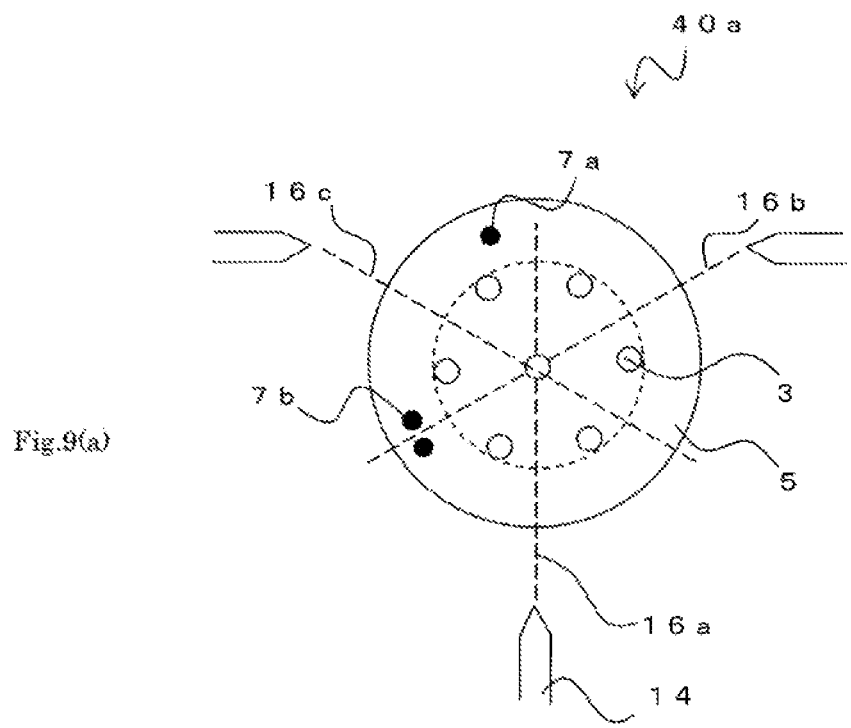

The following describes a method of fusing multicore fibers. FIG. 9(a) illustrates fusion of, for example, the multicore fibers 40a and 40b (an end surface of the multicore fiber 40a is illustrated in FIG. 9(a)). The following fusion method is also applicable to the case in which only one marker is provided. To fuse the multicore fibers together, it is desirable to use three electrodes 14. The three electrodes 14 are disposed at equal distances in the circumferential direction of the multicore fiber 40a. Specifically, the three electrodes 14 are respectively disposed at 120° with respect to the center of the multicore fiber 40a.

Further, the three electrodes 14 are disposed concentrically with respect to the center of the multicore fiber 40a. The phrase "the three electrodes 14 are disposed concentrically and at equal distances in the circumferential direction" indicates that tip portions of the electrodes 14 are disposed concentrically and at equal distances in the circumferential direction.

For example, voltages having phases that are different from one another by 120° are respectively applied between the three electrodes 14 to discharge between the electrodes 14. Accordingly, the multicore fiber 40a is fused by discharges in three directions.

Desirably, the three electrodes 14 are respectively disposed on line-symmetric axes 16a, 16b, and 16c of the multicore fiber 40a. The line-symmetric axes 16a, 16b, and 16c are line-symmetric axes that pass only the core 3 at the center of the multicore fiber 40a and pass between other adjacent cores 3. When the electrodes 14 are disposed in this way, the respective shortest distances from the electrodes 14 to the cores 3 except for the core 3 at the center are equal. This makes it possible to equalize the effect of discharge on the cores 3.

As described above, the markers 7a and 7b and the like are used to splice the multicore fibers together. To check the profiles of light having passed through the markers 7a and 7b with monitors, the markers 7a and 7b are desirably disposed in monitoring directions of the monitors.

Figure 9B:
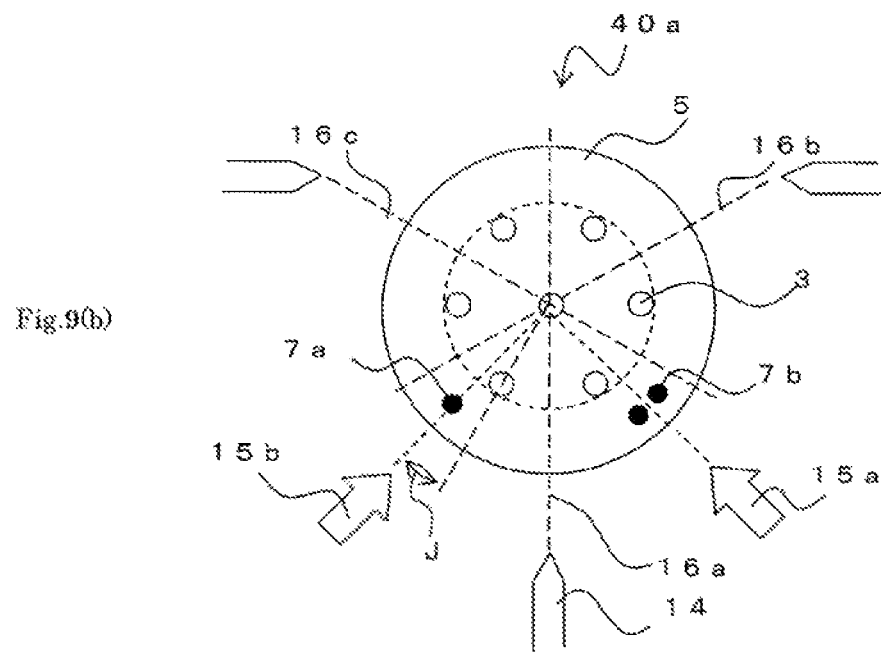

FIG. 9(b) illustrates an appropriate positional relation between the monitoring directions of the monitors 15a and 15b and the disposition of the multicore fiber 40a. The monitors 15a and 15b are positioned perpendicularly to each other to conduct core alignment of the multicore fiber 40a in the XY directions. Thus, as described above, the markers 7a and 7b are desirably disposed perpendicularly to each other. The electrode 14 is disposed, for example, on the line-symmetric axis 16a. Accordingly, the cores 3 positioned to sandwich the line-symmetric axis 16a are positioned on the right and left sides of the line-symmetric axis 16a at 30° from the line-symmetric axis 16a.

On the other hand, the markers 7a and 7b are positioned at 90° with respect to each other. Thus, when the markers 7a and 7b are disposed symmetrically about the line-symmetric axis 16a, the markers 7a and 7b are positioned on the right and left sides of the line-symmetric axis 16a at 45° from the line-symmetric axis 16a. Accordingly, the markers 7a and 7b are disposed at positions that are shifted by 15° from the line-symmetric axis passing through the cores 3. This makes it possible to reliably recognize the orientation of the multicore fiber 40a.

If the markers are disposed on the line-symmetric axis, a wrong end portion of an object to be spliced may be spliced. Thus, the markers are desirably disposed at positions shifted from the line-symmetric axis of the cores 3. In this case, as described above, it is most desirable to dispose each marker at a position that is shifted by 15° from the nearest line-symmetric axis. When the marker is off the line-symmetric axis by 15°, if the fibers to be spliced are spliced in a wrong way, the cores to be spliced are shifted from each other by 30°. Accordingly, when the multicore fiber includes seven cores, the outermost cores are shifted from each other by 60°. Thus, if the fibers are spliced together in a wrong way, the cores are shifted by a maximum amount. Therefore, when light is applied from one direction to align the cores, there is leakage light so that a wrong determination can be avoided.

The larger the amount of shift of the cores to be spliced is, the larger the light loss becomes. Thus, the amount of shift of the cores spliced in a wrong way is desirably large. However, if the amount of shift is 15° or larger, the distance to another core decreases. Thus, most desirably, the marker is shifted by 15° from the line-symmetric axis passing through the cores 3.

The light loss caused by an axial shift of cores of multicore fibers in which the pitch between the cores is 50 µm is calculated as follows. When the shift of the cores is 16° or larger, the light loss is 40 dB or larger, making it possible to reliably recognize the shift of the core positions. Further, when the shift of the cores exceeds 44°, the amount of shift from other cores is smaller than 16°. Therefore, it is desirable to set the positions of the markers such that when the positions of the markers are aligned, the cores are shifted from each other by 16° to 44°.

To set the positions of the markers such that the cores are shifted by 16° to 44° when the positions of the markers are aligned and then the objects to be spliced together are rotated in a wrong way, the positions of the markers may be shifted by 8° to 22°, which is a half of the above range, from the line-symmetric axis passing through the cores. As described above, the most desirable amount of shift is 15°.

Figure 10:
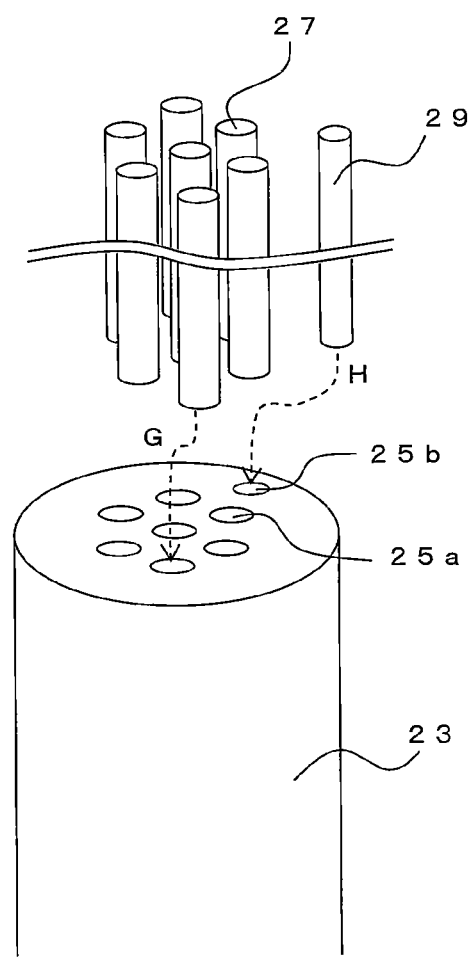
FIG. 10 illustrates how core preforms 27 and a marker preform 29 are inserted into a fiber preform 23.

The following describes an example of a method of producing a multicore fiber. FIG. 10 is a schematic diagram illustrating a part of the steps of producing a multicore fiber. A fiber preform 23 is a component forming a cladding. The fiber preform 23 includes a plurality of holes 25*a* and 25*b* formed in an axial direction. The holes 25*a* are set to correspond to the disposition of cores of the multicore fiber. The hole 25*b* is formed to correspond to the disposition of a marker of the multicore fiber. The disposition of the holes 25*a* and 25*b* is not limited to that illustrated in FIG. 10, and the disposition, number, shape and the like of the holes 25*a* and 25*b* may be set as appropriate according to the form of the cross-sectional surface of the multicore fiber to be produced.

A core preform 27 is inserted in the hole 25*a* (the direction of an arrow G in FIG. 10). Further, a marker preform 29 is inserted in the hole 25*b* (the direction of an arrow H in FIG. 10). The core preform 27 is a component forming a core. The marker preform 29 is a component forming a marker. As described above, the refractive index of the marker preform 29 is lower than the refractive indices of the core preform 27 and the fiber preform 23.

Figure 11A:
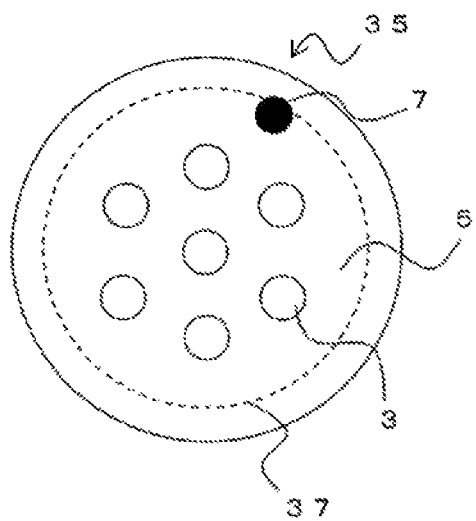
FIG. 11(a) illustrates the step of cutting a surface of a multicore fiber preform 35.
Figure 11B:
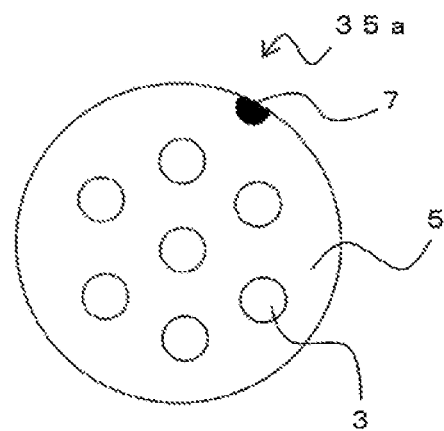

FIG. 11(*a*) illustrates a cross-sectional surface of the resulting multicore fiber preform 35. The obtained multicore fiber preform 35 may directly be subjected to drawing processing described below.

FIG. 11(*b*) is a cross sectional view illustrating a multicore fiber preform 35*a* formed by cutting an outer periphery of the multicore fiber preform 35 along a cut portion 37. The multicore fiber preform 35 is cut along the cut portion 37 to expose the marker preform 29 on the outer periphery of the fiber preform.

Figure 12:
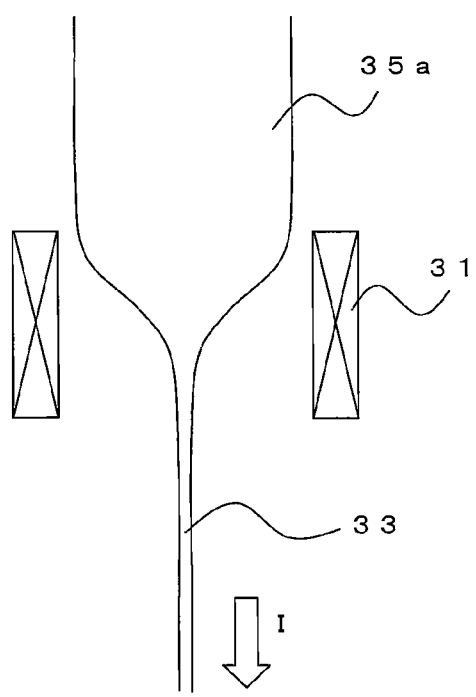

Then, as illustrated in FIG. 12, the multicore fiber preform 35*a* including the core preform 27 and the marker preform 29 inserted therein is drawn while being heated by a heater 31 (the direction of an arrow I in FIG. 12) to form a bare fiber 33. The bare fiber 33 has a cross-sectional surface corresponding to the form of the cross-sectional surface of the multicore fiber preform 35*a*. Thus, a multicore fiber including the marker 7 exposed on a surface of the multicore fiber can be produced with ease.

The disposition, number, shape, size, and the like of the cores 3 and the marker 7 can be changed by setting the disposition, number, shape, and size of the holes 25*a* and 25*b* of the fiber preform as appropriate.

According to the present invention, the marker 7 (7*a*, 7*b*) is provided on the cross sectional surface so that the multicore fiber can be rotation core-aligned with ease using the marker 7 (7*a*, 7*b*). Thus, the core alignment and splicing of the multicore fibers can be performed with ease even in a field.

Further, the marker 7 is disposed at a position shifted from the line-symmetric axes 11*a* and 11*b* of the cross-sectional surface so that both end surfaces of the multicore fiber can be discriminated from each other. Further, two types of markers, the markers 7*a* and 7*b*, are provided so that, similarly, both end surfaces of the multicore fiber can be discriminated from each other.

Further, two types of markers, the markers 7*a* and 7*b*, are disposed substantially perpendicularly to each other so that when the positions of the marker portions are viewed from two different directions, the marker portions can be aligned more reliably.

Further, the refractive index of the marker 7 (7*a*, 7*b*) is set lower than the refractive indices of the cores 3 and the cladding 5 so that the transfer of light from the cores 3 to the marker 7 (7*a*, 7*b*) can be prevented. Furthermore, the size of the marker 7 (7*a*, 7*b*) is set smaller than the size of each core 3 so that the transfer of light from the cores 3 to the marker 7 can be prevented more reliably.

Further, the marker 7 (7*a*, 7*b*) is provided outside the core periphery 9 on the cross-sectional surface of the multicore fiber so that the marker 7 (7*a*, 7*b*) can be recognized more reliably. Further, the marker (7*a*, 7*b*) is exposed on the surface of the multicore fiber so that the discriminability of the marker can be improved.

The multicore fiber including the marker 7 exposed on the outer surface of the multicore fiber can be obtained with ease by cutting an outer surface of a predetermined multicore fiber preform up to a predetermined position and then drawing the multicore fiber preform.

Further, after the multicore fibers are disposed to face each other, light is applied to the sides of the multicore fibers, and the light having passed through the respective multicore fibers is monitored at the opposite side to obtain the profiles of the light so that the positions of the markers of the multicore fibers can be compared to each other.

While the foregoing describes the embodiments of the present invention with reference to the attached drawings, the scope of the invention is not limited to the embodiments. It will be apparent to those skilled in the art that various modifications and variations can be made to the present invention without departing from the spirit and scope of the invention. Thus, it is intended that the present invention covers the modifications and variations of this invention provided they come within the scope of the invention set forth in the appended claims.

For example, while the foregoing embodiment describes the markers having a different function from those of the cores, a part of the cores may function as the marker. For example, the size, refractive index, distance from the center, etc. of the core that also functions as the marker may be set differently from those of the other cores to use the core as the marker.

Further, the dopant concentration of the marker may be changed so that a fusion splicer can recognize the position of the marker on the cross-sectional surface from a hot image that is radiant light generated during heating. Specifically, the multicore fibers may be heated to spontaneously emit light, and a light distribution of the light may be measured to determine the position of the marker on the cross-sectional surface.

Further, the core alignment method according to the present invention is also applicable to any splicing method other than fusion splicing such as fixing with an adhesive agent and butt-joining using V-grooves (mechanical splice).

EXPLANATION OF REFERENCE NUMERALS 1, 10, 20, 30, 35, 35a, 40, 40a, 40b . . . Multicore fiber
3 . . . Core
5 . . . Cladding
7, 7a, 7b . . . Marker
9 . . . Core periphery
11a, 11b . . . Line-symmetric axis
13 . . . Light source
14 . . . Electrode
15a, 15b . . . Monitor
16a, 16b, 16c . . . Line-symmetric axis
17a, 17b . . . Central axis
19 . . . Low luminance portion
21 . . . Mirror
23 . . . Fiber preform
25a, 25b . . . Hole
27 . . . Core preform
29 . . . Marker preform
31 . . . Heater
33 . . . Bare fiber
35, 35a . . . Multicore fiber preform
37 . . . Cut portion

The invention claimed is:

1. A method for fusion splicing a multicore fiber in which at least one of objects to be spliced together is a multicore fiber including a plurality of core portions, a cladding portion surrounding the plurality of core portions, and a marker portion disposed apart from the plurality of core portions, the method comprising:
disposing the multicore fiber to face an object to be spliced that includes a marker corresponding to the marker portion;
determining a position of each of the core portions of the multicore fiber by use of the marker portion, and conducting rotation core alignment of the position with a position of a desired core portion of the object to be spliced; and
fusing the multicore fiber with the object to be spliced, wherein
the multicore fiber and the object to be spliced are fused together by discharges of three electrodes disposed in three directions on a cross-sectional surface of the multicore fiber, and
the three electrodes are disposed at equal distances in a circumferential direction on three line-symmetric axes with respect to a disposition of the plurality of core portions on the cross-sectional surface of the multicore fiber, the three line-symmetric axes passing through only the core portion disposed at the center.

2. The method of claim 1, wherein at least one marker portion is disposed at a position shifted from an arbitrary line-symmetric axis with respect to a disposition of the plurality of core portions on a cross-sectional surface of the multicore fiber.

3. The method of claim 1, wherein two or more types of the marker portions are provided, and some or all of the marker portions are positioned substantially perpendicularly to each other on a cross-sectional surface of the multicore fiber.

4. The method of claim 1, wherein the multicore fiber includes seven core portions in total, which are disposed at a center and around the center at equal distances in a hexagonal shape.

5. The method of claim 4, wherein at least one marker portion is disposed at a position shifted from an arbitrary line-symmetric axis with respect to the disposition of the plurality of core portion, and
wherein an angle of a positional shift from a nearest line-symmetric axis is 8° to 22°.

6. The method of claim 1, wherein two or more types of the marker portions are provided, wherein some or all of the marker portions are positioned substantially perpendicularly to each other on a cross-sectional surface of the multicore fiber, and wherein each of the marker portions is formed on any of the line-symmetric axes with respect to a disposition of the plurality of core portions.

7. The method of claim 1, wherein the marker portion has a refractive index that is different from a refractive index of the core portion and a refractive index of the cladding portion.

8. The method of claim 7, wherein the marker portion is made of a material having a refractive index that is lower than a refractive index of the cladding portion.

9. The method of claim 7, wherein the marker portion is an empty hole.

10. The method of claim 1, wherein at least one marker portion is provided outside the core portions that are outermost core portions on a cross-sectional surface of the multicore fiber.

11. The method of claim 10, wherein the marker portion is exposed on a surface of the multicore fiber.

12. The method of claim 1, wherein after the multicore fibers are disposed to face each other, light is applied to side surfaces of the multicore fibers so that profiles of the light having passed through the multicore fibers are obtained to determine positions of the marker portions of the multicore fibers, and core portions of the multicore fibers are aligned.

13. The method of claim 12, wherein the light is applied to the multicore fibers from two directions that are substantially perpendicular to each other so that profiles of the light having passed through the multicore fibers are determined, and central positions of the multicore fibers are aligned.

14. The method of claim 1, wherein after the multicore fiber and the object to be spliced are disposed to face each other, end surfaces of the multicore fiber and the object are checked to determine a position of the marker portion of the multicore fiber, and positions of the core portions of the multicore fiber are aligned.

* * * * *